(12) United States Patent
MacInnis

(10) Patent No.: US 10,334,288 B2
(45) Date of Patent: Jun. 25, 2019

(54) METHOD AND SYSTEM FOR ZERO OVERHEAD PARALLEL ENTROPY DECODING

(75) Inventor: Alexander G. MacInnis, Los Altos, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 651 days.

(21) Appl. No.: 13/158,061

(22) Filed: Jun. 10, 2011

(65) Prior Publication Data

US 2011/0305282 A1    Dec. 15, 2011

Related U.S. Application Data

(60) Provisional application No. 61/354,982, filed on Jun. 15, 2010.

(51) Int. Cl.
| | |
|---|---|
| *H04N 19/44* | (2014.01) |
| *H04N 21/24* | (2011.01) |
| *H04N 21/44* | (2011.01) |
| *H04N 19/436* | (2014.01) |
| *H04N 21/236* | (2011.01) |
| *H04N 21/434* | (2011.01) |
| *H04N 21/2343* | (2011.01) |

(52) U.S. Cl.
CPC ... *H04N 21/234327* (2013.01); *H04N 19/436* (2014.11); *H04N 19/44* (2014.11); *H04N 21/236* (2013.01); *H04N 21/2401* (2013.01); *H04N 21/434* (2013.01); *H04N 21/44004* (2013.01)

(58) Field of Classification Search
CPC ...... H04N 19/61; H04N 19/176; H04N 19/70; H04N 19/46; H04N 19/13; H04N 19/174; H04N 19/91
USPC ...................... 375/240.25; 370/537
See application file for complete search history.

(56) References Cited

U.S. PATENT DOCUMENTS

| | | | | |
|---|---|---|---|---|
| 2002/0034253 A1* | 3/2002 | Nagai | ................ | H04N 21/4348 375/240.25 |
| 2004/0264566 A1* | 12/2004 | Kato | .................... | G11B 27/036 375/240.01 |
| 2006/0193350 A1* | 8/2006 | Chen | ............................ | 370/537 |
| 2009/0092326 A1* | 4/2009 | Fukuhara et al. | ............ | 382/233 |
| 2010/0020866 A1* | 1/2010 | Marpe et al. | ............ | 375/240.02 |

* cited by examiner

*Primary Examiner* — Farhan Mahmud
(74) *Attorney, Agent, or Firm* — Daniel Rose, Esq.; Foley & Lardner LLP

(57) ABSTRACT

Certain embodiments of the invention may be found in a system and/or method for zero overhead parallel entropy decoding. Exemplary aspects of the invention may comprise a decoder that comprises a demultiplexer. An encoded bit stream may be demultiplexed into a plurality of sub-streams. The encoded bit stream may be constructed without adding one or more bits to the encoded bit stream to facilitate the demultiplexing. Exemplary aspects of the invention may also comprise an encoder that comprises a multiplexer. Each of a plurality of encoded sub-streams may be multiplexed into an encoded bit stream. The encoded bit stream may be constructed without adding one or more bits to the encoded bit stream to indicate the multiplexing.

16 Claims, 11 Drawing Sheets

METHOD AND SYSTEM FOR ZERO OVERHEAD PARALLEL ENTROPY DECODING

CROSS-REFERENCE TO RELATED APPLICATIONS/INCORPORATION BY REFERENCE

This application makes reference to, claims priority to, and claims the benefit of U.S. Provisional Patent Application Ser. No. 61/354,982, filed on Jun. 15, 2010.

The above stated application is incorporated herein by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

Certain embodiments of the invention relate to digital video systems. Embodiments may relate to data compression and decompression systems. More specifically, certain embodiments of the invention relate to a method and system for zero overhead parallel entropy decoding.

BACKGROUND OF THE INVENTION

Entropy coding is widely used in the coding of video, audio, and other data sets. There are many types of entropy coding, for example, variable length coding (VLC) or arithmetic coding. In either type of coding, the number of bits used to represent a syntax element may vary widely, and the number of bits may generally vary with the values of each syntax element. Therefore, the number of bits used to code a syntax element generally may not be known before the syntax element is coded in an encoder or decoded in a decoder.

For VLC decoding, a normal fast logic design may decode one syntax element per clock, at clock rates that may be typical of synthesized logic. Arithmetic coding on the other hand, may typically utilize modern decoders to decode at most approximately one bin per clock or slower, and there may be on average more than one bin to decode for each bit in the bit stream.

One of the trends in video coding includes an increase in the throughput rate that may be driven by increases in both picture sizes and frame rates. For example, a move from standard definition television (SDTV) to the high definition television (HDTV) standard may involve an increase of six times the throughput rate. A move to 1080 p video at 60 frames per second may involve another doubling of the throughput rate. A migration to 4K×2K picture size may be another factor of four increase in the throughput rate. The support for 3-D video may further double the frame rate, and frame rates may increase to 120 Hz, which may involve yet another doubling of the throughput rate. This trend significantly increases the challenges of real time entropy decoding. For example, decoding a video stream in real time using the H.264/MPEG-4 AVC standard at High Profile, with a frame size of 1920×1088 pixels and a frame rate of 60 frames per second may require decoding 489,600 [(1920*1088)/256*60)] macroblocks per second, while decoding a stream with a frame size of 4096×2160 pixels at 120 frames per second may require decoding 4,147,200 [(4096*2160)/256*120] macroblocks per second. Each macroblock may comprise thousands of entropy-coded bits, for example.

Another trend in video coding is towards more efficient compression coding. Arithmetic coding is generally more efficient than VLC coding, while it may be significantly more complex, and current arithmetic coding designs may have lower throughput than current VLC designs. Some improvements in the coding efficiency of entropy coding may aggravate real time entropy decoding. The trend towards more efficient compression coding also may make it unattractive to add information to a bit stream to facilitate fast decoding.

Furthermore, another trend in video coding is towards layered coding, wherein coded video pictures and sequences may be represented by multiple layers of data. The use of layered coding may increase the number of syntax elements that are decoded in order to decode and reconstruct each picture. Another trend in video coding is towards low latency encoding and decoding, which may make some fast coding and decoding approaches less practical.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for zero overhead parallel entropy decoding, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for zero overhead parallel entropy decoding. Exemplary aspects of the invention may comprise a decoder that comprises a demultiplexer. An encoded bit stream may be demultiplexed into a plurality of sub-streams. The encoded bit stream may be constructed without adding one or more bits to the encoded bit stream to facilitate the demultiplexing.

Exemplary aspects of the invention may also comprise an encoder that comprises a multiplexer. Each of a plurality of encoded sub-streams may be multiplexed into an encoded bit stream. The encoded bit stream may be constructed without adding one or more bits to the encoded bit stream to indicate the multiplexing.

Entropy decoders that may be designed with multiple, parallel, and/or concurrent entropy decoding functions may have greater throughput. However, typical current efficiently coded video bit streams may not contain sufficient information to enable a decoder to divide the stream in such a way as to enable parallel entropy decoding. Furthermore, in general methods that facilitate parallel entropy decoding may involve adding information to the bit stream that might otherwise not be present, thereby decreasing the coding efficiency. The rate of entropy decoding may be limited to a rate that may be achieved by serial decoders using available technology at acceptable clock rates and complexity. A possible partial solution, such as decoding one slice, for example, a row of macroblocks at a time in each of multiple decoding sub-systems, with multiple slices being decoded in parallel, may tend to decrease coding efficiency while adding a significant amount of decoding hardware complexity and latency, and such methods may not perform as expected with all streams, since most current video standards do not require any particular pattern of slices to be created by encoders.

Figure 1:
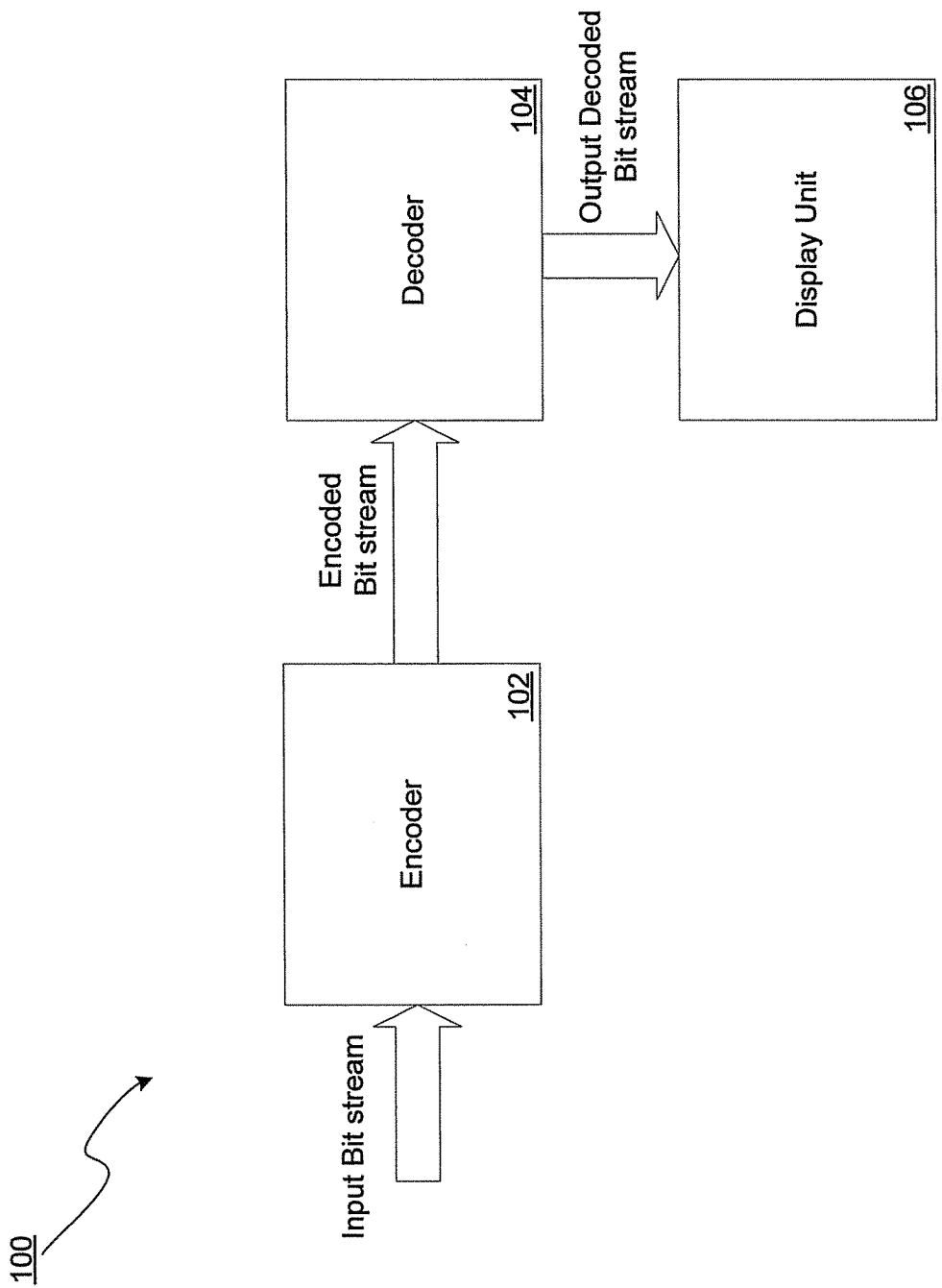
FIG. 1 is a block diagram of an exemplary video processing system that may be utilized in connection with an embodiment of the invention.

FIG. 1 is a block diagram of an exemplary video processing system that may be utilized in connection with an embodiment of the invention. Referring to FIG. 1, there is shown a video processing system 100. The video processing system 100 may comprise an encoder 102, a decoder 104, and a display unit 106.

The encoder 102 may comprise suitable logic, circuitry, interface, and/or code that may be operable to receive an input bit stream and generate an encoded bit stream associated with a particular video standard, for example, MPEG-2 or H.264/MPEG-4 AVC. The input bit stream may comprise a series of images represented by frames. The frames may comprise two-dimensional grids of pixels. An exemplary input bit stream, such as a video sequence in accordance with ITU-656, may include 30 720×480 pixel frames per second, for example. Notwithstanding, the invention may not be so limited and other video sequences or other types of data with different bit rates, frame sizes, and frame rates may be input at the encoder 102 without limiting the scope of the invention. The encoder 102 may be operable to encode the input bit stream and transmit the encoded bit stream to the decoder 104.

The decoder 104 may comprise suitable logic, circuitry, interface, and/or code that may be operable to receive and decode the encoded bit stream associated with the particular video standard, for example, MPEG-2 or H.264/MPEG-4 AVC, into a decoded bit stream. The decoded bit stream may be communicated to the display unit 106.

The display unit 106 may comprise suitable logic, circuitry, interface, and/or code that may be operable to receive the decoded bit stream for displaying on the display unit 106.

In accordance with an embodiment of the invention, the bit streams may be constructed by the encoder 102 in such a way that the decoder 104 may be operable to demultiplex the bit stream into a plurality of sub-streams, and entropy decode each of the plurality of sub-streams in parallel and/or concurrently. There are no bits added to the bit stream to facilitate the demultiplexing. The bit stream may be logically organized into sub-streams, such that each sub-stream may be entropy decoded independently of the entropy decoding of the other sub-streams. The multiplexing and demultiplexing operations may be controlled by equivalent instances of a model of a demultiplexer and parallel entropy decoders, as described with respect to FIG. 2. Alternatively, the multiplexing and demultiplexing operations may be controlled with multiplexing and demultiplexing controllers, respectively, such that the respective controllers control the multiplexing operation to perform a function that is the inverse of the demultiplexing operation. A multiplexing controller is described with respect to FIG. 4, and a demultiplexing controller is described with respect to FIG. 6B.

Figure 2:
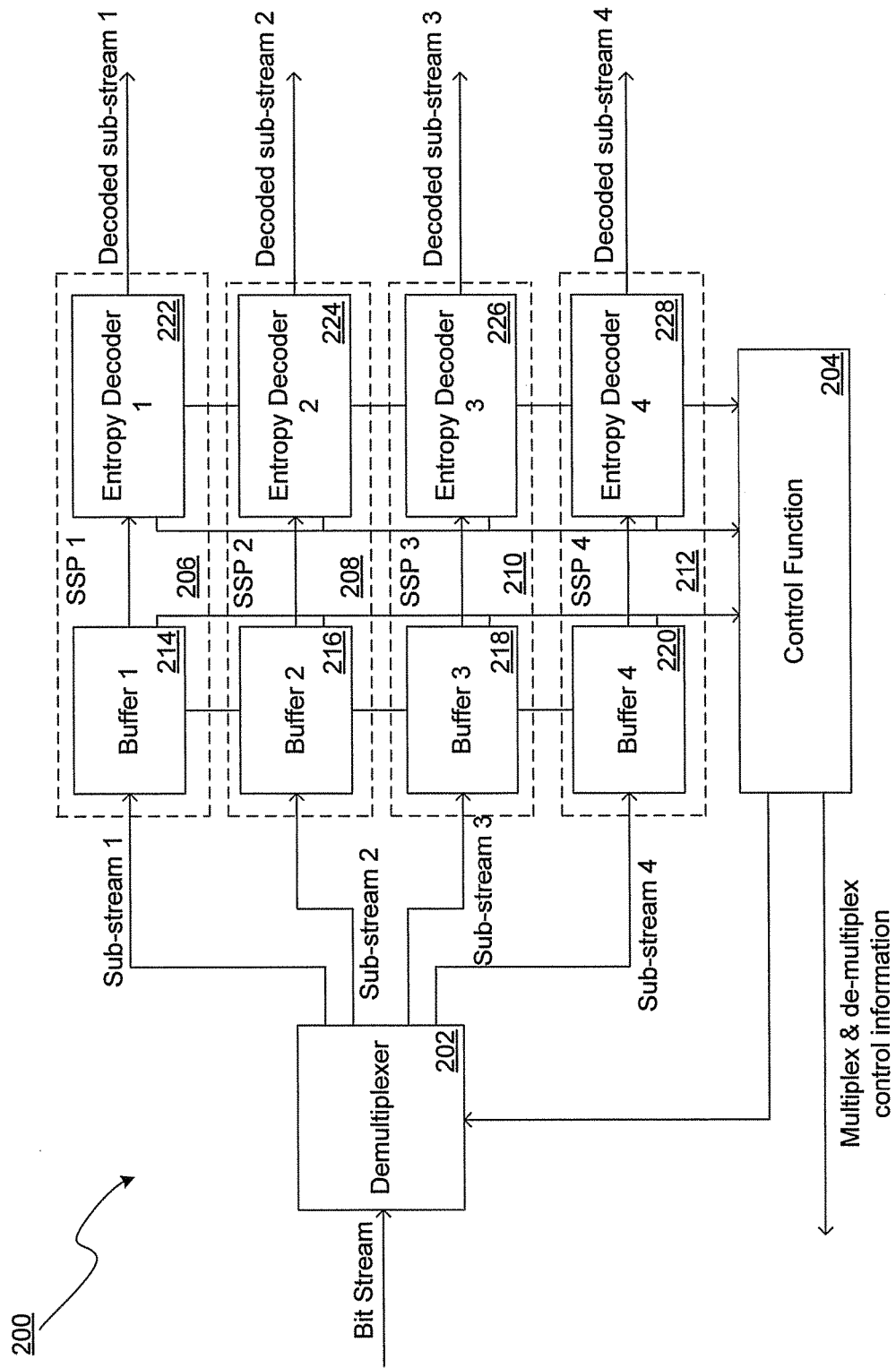
FIG. 2 is a block diagram of an exemplary demultiplexing model, in accordance with an embodiment of the invention.

FIG. 2 is a block diagram of an exemplary demultiplexing model, in accordance with an embodiment of the invention. Referring to FIG. 2, there is shown a demultiplexing model 200. The demultiplexing model 200 may comprise a demultiplexer 202, a control function 204, and a plurality of sub-stream processors (SSPs) 206, 208, 210, and 212. Each of the plurality of SSPs may comprise a buffer and an entropy decoder. For example, the sub-stream processor (SSP) 1 206 may comprise a buffer 1 214 and an entropy decoder 1 222. Similarly, the SSP 2 208 may comprise a buffer 2 216 and an entropy decoder 2 224. The SSP 3 210 may comprise a buffer 3 218 and an entropy decoder 3 226. The SSP 4 212 may comprise a buffer 4 220 and an entropy decoder 4 228.

The demultiplexer 202 may comprise suitable logic, circuitry, interfaces, and/or code that may be operable to model the receipt of an encoded bit stream and model the demultiplexing of at least a portion of the encoded bit stream into a plurality of sub-streams, for example, sub-stream 1, sub-stream 2, sub-stream 3, and sub-stream 4. Notwithstanding, the invention may not be so limited, and the demultiplexer 202 may be operable to model the demultiplexing of the encoded bit stream into any number of sub-streams without limiting the scope of the invention. In accordance with an embodiment of the invention, the encoded bit stream may be constructed without adding one or more bits to the encoded bit stream to facilitate the demultiplexing operation.

Each of the plurality of buffers, for example, the buffers 214, 216, 218, and 220 may comprise suitable logic, circuitry, interfaces, and/or code that may be operable to model the storage of data corresponding to one or more of the demultiplexed plurality of sub-streams. For example, the buffer 214 may be operable to model the storage of data corresponding to sub-stream 1. Similarly, the buffer 216 may be operable to model the storage of data corresponding to sub-stream 2, the buffer 218 may be operable to model the storage of data corresponding to sub-stream 3, and the buffer 220 may be operable to model the storage of data corresponding to sub-stream 4.

In accordance with another embodiment of the invention, the sizes of each of the plurality of buffers 214, 216, 218, and 220 in the demultiplexing model 200 may be designed for each sub-stream, for example. The demultiplexing model 200 may be designed such that each of the plurality of buffers 214, 216, 218, and 220 may be sufficiently large to model the holding of the maximum possible number of bits in each sub-stream associated with one synchronization unit. A synchronization unit may be, for example, a slice or a macroblock of video data, a sub-set of a macroblock, a pixel, a group of pixels, a transform coefficient, a set of transform coefficients, a sample, a unit of samples, or some other coding unit, or a suitable unit of data associated with any data type. A synchronization unit is a set of data from one synchronization point to the next synchronization point. Synchronization points may correspond to points in the bit stream where the state of all sub-streams may be known, without requiring coordination between the functions of processing the individual sub-streams. A synchronization point may be a point in a bit stream where each of the sub-streams reaches an identified state. When all sub-streams have been processed to the same synchronization point, the synchronization unit that precedes that synchronization point may be considered to have been completely processed.

Each of the plurality of entropy decoders, for example, the entropy decoders 222, 224, 226, and 228 may comprise suitable logic, circuitry, interfaces, and/or code that may be operable to model the entropy decoding of at least a portion of each of the modeled stored demultiplexed plurality of sub-streams independently and/or in parallel. Each of the plurality of entropy decoders, for example, the entropy decoders 222, 224, 226, and 228 may be operable to model the generation of a decoded sub-stream. Alternatively, the entropy decoders in the demultiplexing model 200 may not produce, and may not model the production of, decoded sub-streams. For example, the entropy decoder 222 may be operable to model the entropy decoding of at least a portion of data corresponding to sub-stream 1 and model the generation of a decoded sub-stream 1. Similarly, the entropy decoder 224 may be operable to model the entropy decoding of at least a portion of data corresponding to sub-stream 2 and model the generation of a decoded sub-stream 2, the entropy decoder 226 may be operable to model the entropy decoding of at least a portion of data corresponding to sub-stream 3 and model the generation of a decoded sub-stream 3, and the entropy decoder 228 may be operable to model the entropy decoding of at least a portion of data corresponding to sub-stream 4 and model the generation of a decoded sub-stream 4. The modeling of the entropy decoding of a sub-stream may comprise, for example, maintaining a count of the number of bits used to encode one or more syntax elements. The number of bits used to decode one or more syntax elements may be inferred from, for example, information provided by an entropy decoder or by an entropy encoder.

The plurality of entropy decoders 222, 224, 226, and 228 may be operable to model the processing of their respective sub-streams at different rates from one synchronization point to the next synchronization point, for example. Synchronization points may facilitate the coordination of the demultiplexing control function 204 with the activities of the plurality of entropy decoders 222, 224, 226, and 228.

The control function 204 may comprise suitable logic, circuitry, interfaces, and/or code that may be operable to receive status updates from the plurality of buffers 214, 216, 218, and 220, and the plurality of entropy decoders 222, 224, 226, and 228, and generate a control signal to the demultiplexer 202. For example, the control function 204 may be operable to receive the amount of data stored in each buffer corresponding to each sub-stream. The control function 204 may be operable to determine the amount of stored data that has been decoded by each of the entropy decoders corresponding to each sub-stream. The control function 204 may be operable to accordingly generate a control signal to the demultiplexer 202 to indicate whether one or more of the buffers 214, 216, 218, and 220 need more data so that they can be decoded by one or more of the corresponding entropy decoders 222, 224, 226, and 228. The control function 204 may be operable to communicate the control signal to a multiplexer 302 in the encoder 300, as described with respect to FIG. 3, or to a demultiplexer 602 in the decoder 600, as described with respect to FIG. 6.

Figure 3:
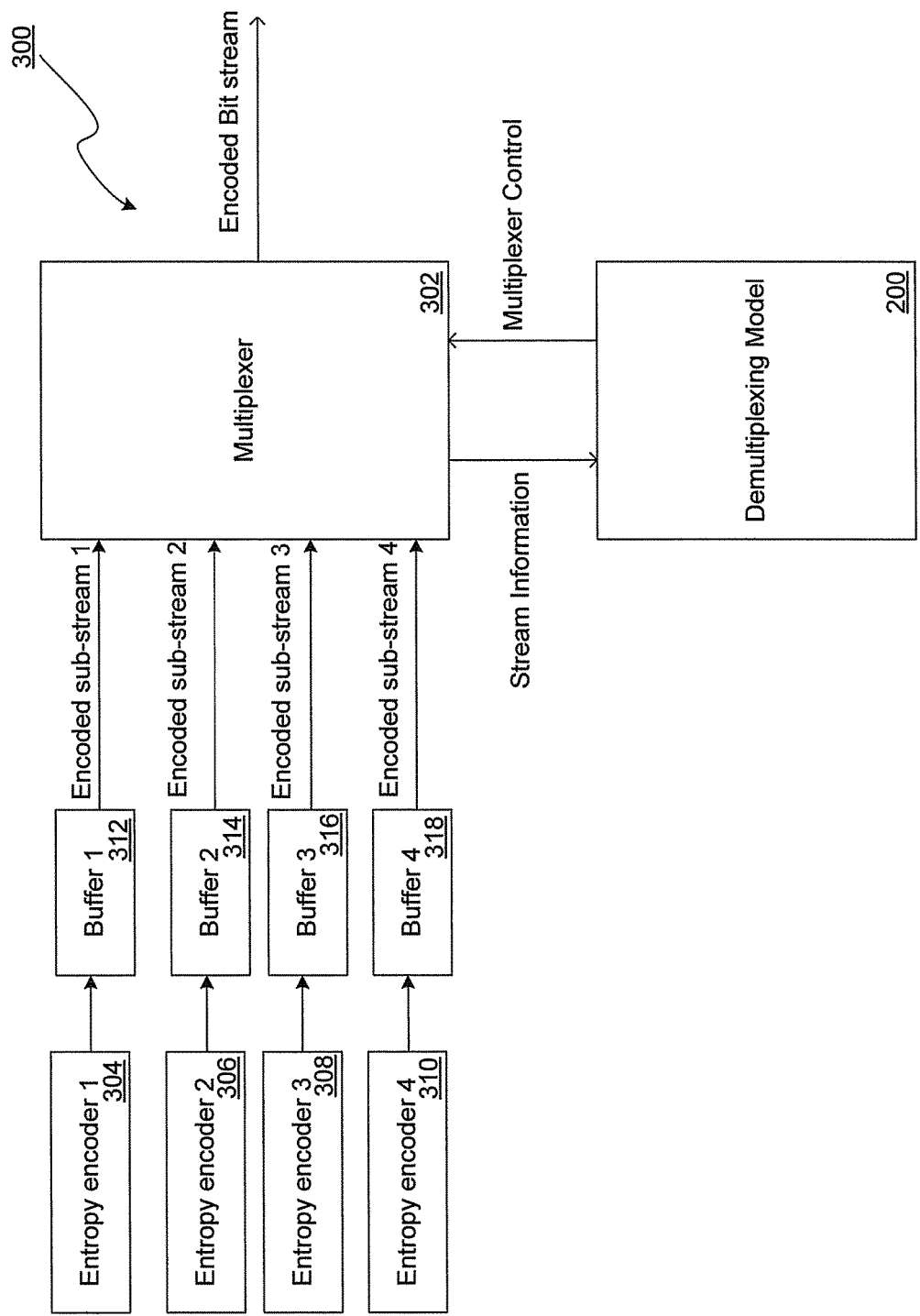
FIG. 3 is a block diagram of an exemplary encoder comprising a multiplexer and a demultiplexing model, in accordance with an embodiment of the invention.

FIG. 3 is a block diagram of an exemplary encoder comprising a multiplexer and a demultiplexing model, in accordance with an embodiment of the invention. Referring to FIG. 3, there is shown an encoder 300. The encoder 300 may comprise a demultiplexing model 200, as described with respect to FIG. 2, a multiplexer 302, a plurality of entropy encoders 304, 306, 308, and 310, and a plurality of buffers 312, 314, 316, and 318.

Each of the plurality of entropy encoders, for example, the entropy encoders 304, 306, 308, and 310 may comprise suitable logic, circuitry, interfaces, and/or code that may be operable to entropy encode at least a portion of each of a plurality of sub-streams independently, and in parallel. Each of the plurality of entropy encoders, for example, the entropy encoders 304, 306, 308, and 310 may be operable to generate an encoded sub-stream. For example, the entropy encoder 304 may be operable to entropy encode at least a portion of data corresponding to sub-stream 1 and generate an encoded sub-stream 1. Similarly, the entropy encoder 306 may be operable to entropy encode at least a portion of data corresponding to sub-stream 2 and generate an encoded sub-stream 2, the entropy encoder 308 may be operable to entropy encode at least a portion of data corresponding to sub-stream 3 and generate an encoded sub-stream 3, and the entropy encoder 310 may be operable to entropy encode at least a portion of data corresponding to sub-stream 4 and generate an encoded sub-stream 4.

Each of the plurality of buffers, for example, the buffers 312, 314, 316, and 318 may comprise suitable logic, circuitry, interfaces, and/or code that may be operable to store data corresponding to one or more of the encoded plurality of sub-streams. For example, the buffer 312 may be operable to store data corresponding to encoded sub-stream 1. Similarly, the buffer 314 may be operable to store data corresponding to encoded sub-stream 2, the buffer 316 may be operable to store data corresponding to encoded sub-stream 3, and the buffer 318 may be operable to store data corresponding to encoded sub-stream 4.

The multiplexer 302 may comprise suitable logic, circuitry, interfaces, and/or code that may be operable to concurrently multiplex each of the plurality of encoded sub-streams, for example, encoded sub-stream 1, encoded sub-stream 2, encoded sub-stream 3, and encoded sub-stream 4 into an encoded bit stream. The encoded bit stream may be constructed without adding one or more bits to the encoded bit stream to indicate the multiplexing operation. Notwithstanding, the invention may not be so limited, and the multiplexer 302 may be operable to multiplex any of a plurality of encoded sub-streams into the encoded bit stream without limiting the scope of the invention.

The demultiplexing model 200 may be operable to receive bit stream information from the multiplexer 302 and generate a control signal to the multiplexer 302 in order to control the multiplexing operation. The demultiplexing model 200 may be operable to model the behavior of the demultiplexer 202 and the entropy decoders 222, 224, 226, and 228. The demultiplexing model 200 may be operable to determine the number of bits or words to be inserted into the multiplexed bit stream for each sub-stream by the multiplexer 302 based on the behavior of the demultiplexer 202 and the entropy decoders 222, 224, 226, and 228.

In accordance with an embodiment of the invention, for each instance in which the demultiplexing model 200 models the demultiplexing of the bit stream into a plurality of sub-streams, for example, sub-stream 1, sub-stream 2, sub-stream 3, and sub-stream 4, the multiplexer 302 may be operable to concurrently multiplex the plurality of encoded sub-streams, for example, encoded sub-stream 1, encoded sub-stream 2, encoded sub-stream 3, and encoded sub-stream 4 to generate an encoded bit stream. The encoded bit stream may be generated in such a way that when processed by the demultiplexer 602, as described with respect to FIG. 6, it may correctly demultiplex the bit stream into the plurality of sub-streams, for example, sub-stream 1, sub-stream 2, sub-stream 3, and sub-stream 4. The multiplexer 302 may not insert information into the bit stream to indicate the multiplexing operation.

Figure 4:
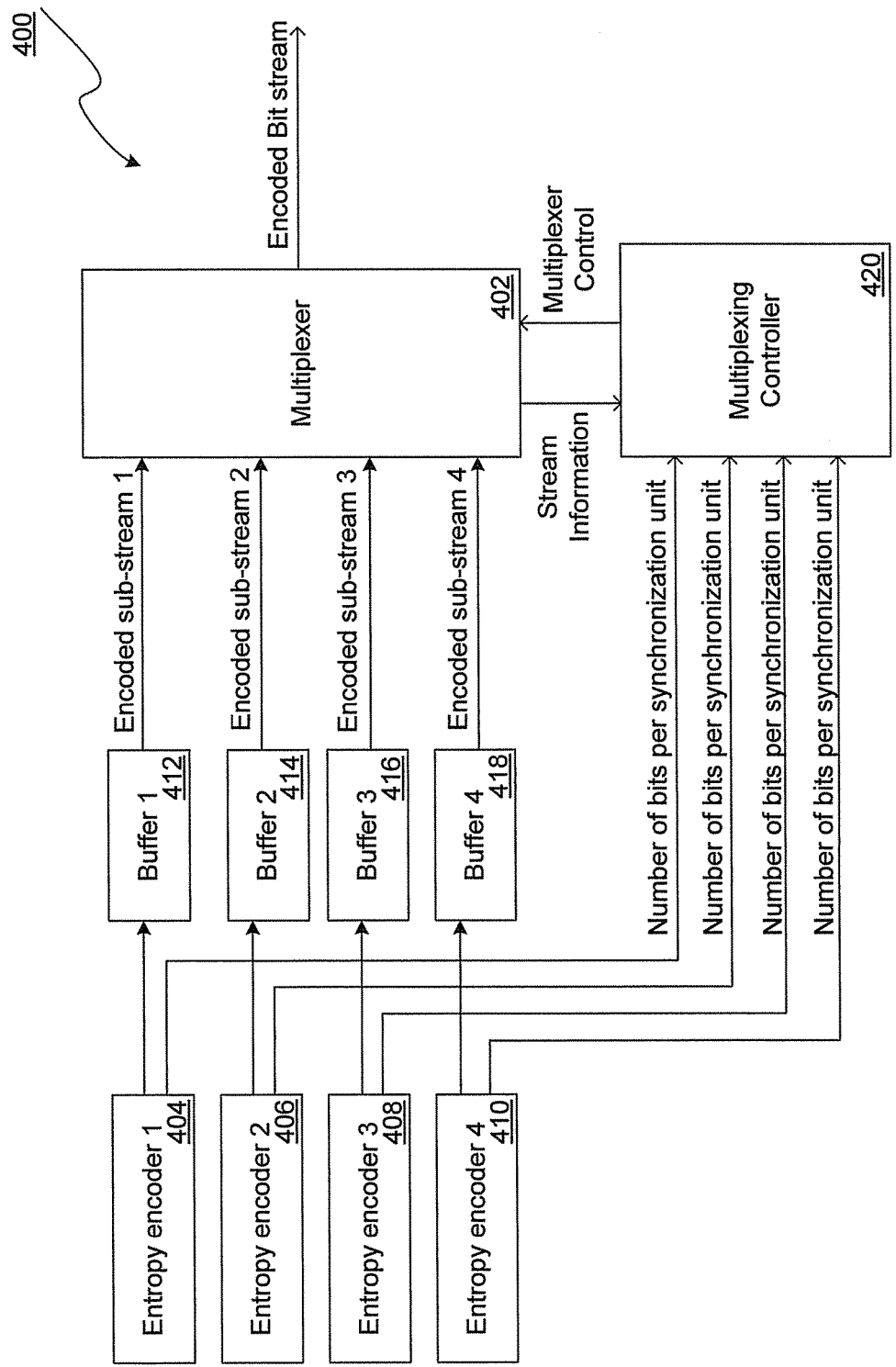
FIG. 4 is another block diagram of an exemplary encoder comprising a multiplexing controller, in accordance with an embodiment of the invention.

FIG. 4 is another block diagram of an exemplary encoder comprising a multiplexing controller, in accordance with an embodiment of the invention. Referring to FIG. 4, there is shown an encoder 400. The encoder 400 may comprise a multiplexing controller 420, a multiplexer 402, a plurality of entropy encoders 404, 406, 408, and 410, and a plurality of buffers 412, 414, 416, and 418. Notwithstanding, the multiplexing controller 420 may be replaced by the demultiplexing model 200 in FIG. 4 without limiting the scope of the invention. The multiplexer 402 may be substantially similar to the multiplexer 302 as described with respect to FIG. 3. Similarly, the plurality of entropy encoders 404, 406, 408, and 410 may be substantially similar to the plurality of entropy encoders 304, 306, 308, and 310 as described with respect to FIG. 3. The plurality of buffers 412, 414, 416, and 418 may be substantially similar to the plurality of buffers 312, 314, 316, and 318 as described with respect to FIG. 3.

In operation, each of the plurality of entropy encoders 404, 406, 408, and 410 may be operable to generate an encoded sub-stream to each of the corresponding plurality of buffers 412, 414, 416, and 418 respectively. Each of the plurality of buffers 412, 414, 416, and 418 may be operable to store data corresponding to each of the encoded sub-streams. Each of the plurality of entropy encoders 404, 406, 408, and 410 may be operable to communicate the number of bits utilized to encode a synchronization unit for each sub-stream to the multiplexing controller 420. The multiplexing controller 420 may be operable to utilize the received information from the plurality of entropy encoders 404, 406, 408, and 410 and/or the bit stream information from the multiplexer 402 in order to generate a control signal to the multiplexer 402. The multiplexer 402 may be operable to respond to the control signal from the multiplexing controller 420 and to multiplex the encoded sub-streams into the encoded bit stream, with a multiplex pattern that may be suitable for demultiplexing and decoding, for example, by the decoder 600, as described with respect to FIG. 6.

Figure 5:
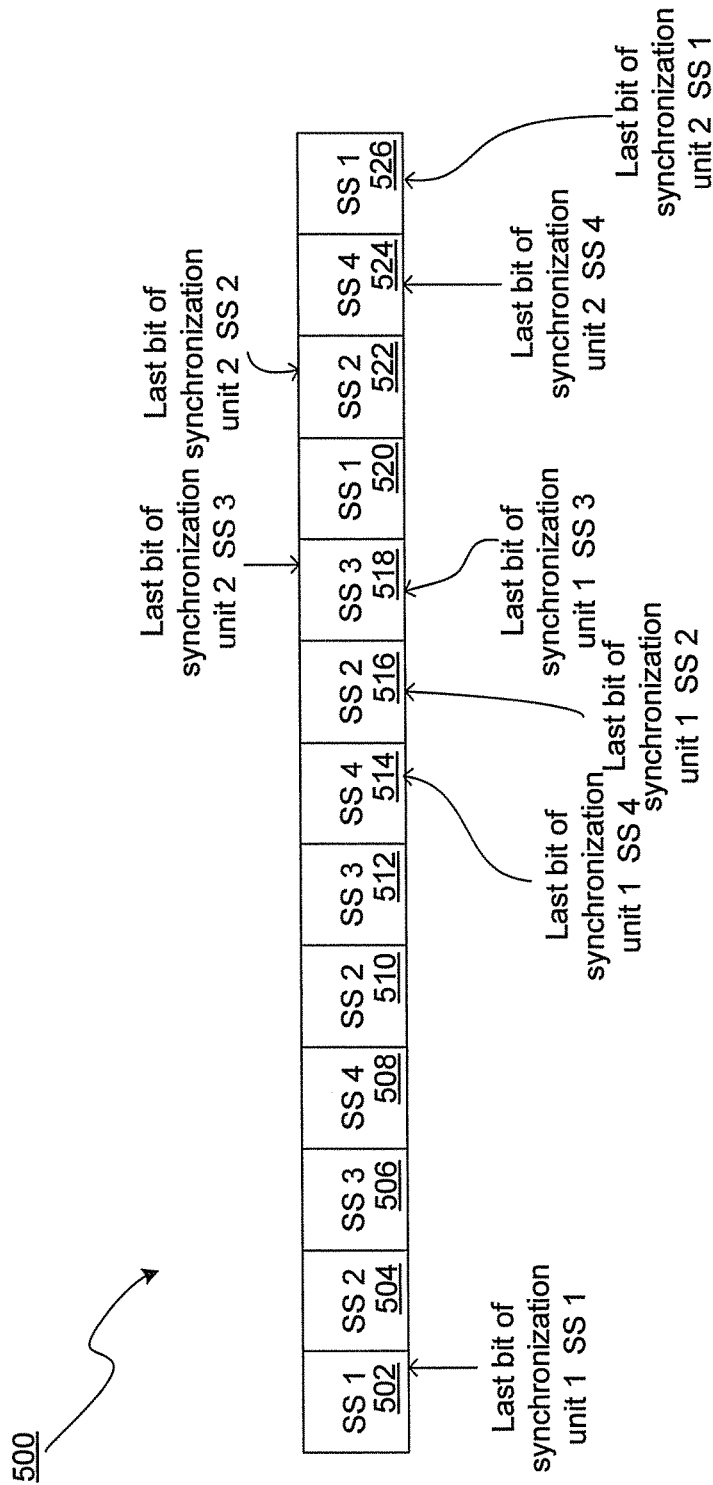
FIG. 5 is a diagram of an exemplary multiplexed bit stream, in accordance with an embodiment of the invention.

FIG. 5 is a diagram of an exemplary multiplexed bit stream, in accordance with an embodiment of the invention. Referring to FIG. 5, there is shown an example of a multiplexed encoded bit stream 500 that may be generated by the multiplexer 302 or the multiplexer 402. The multiplexed encoded bit stream 500 may comprise a plurality of data words 502, 504, 506, 508, 510, 512, 514, 516, 518, 520, 522, 524, and 526, for example.

In accordance with an embodiment of the invention, the multiplexed encoded bit stream 500 may be constructed without adding one or more bits to the multiplexed encoded bit stream 500 to indicate the multiplexing operation. For example, the multiplexed encoded bit stream 500 may comprise a sequence of encoded bits, word 502 corresponding to sub-stream (SS) 1, word 504 corresponding to SS 2, word 506 corresponding to SS 3, and word 508 corresponding to SS 4. The word 502 may also comprise a last encoded bit of SS 1 for a first synchronization unit. Accordingly, the multiplexed encoded bit stream 500 may comprise a next sequence of encoded bits, word 510 corresponding to SS 2, word 512 corresponding to SS 3, and word 514 corresponding to SS 4. The word 514 may also comprise a last encoded bit of SS 4 for the first synchronization unit. Accordingly, the multiplexed encoded bit stream 500 may comprise a next sequence of encoded bits, word 516 corresponding to SS 2, and word 518 corresponding to SS 3. The word 516 may also comprise a last encoded bit of SS 2 for the first synchronization unit, and the word 518 may also represent a last encoded bit of SS 3 for the first synchronization unit.

In accordance with an embodiment of the invention, the multiplexed encoded bit stream 500 may comprise a sequence of encoded bits corresponding to a second synchronization unit. The word 518 may also comprise a last encoded bit of SS 3 for the second synchronization unit. Accordingly, the multiplexed encoded bit stream 500 may comprise a next sequence of encoded bits, word 520 corresponding to SS 1, word 522 corresponding to SS 2, and word 524 corresponding to SS 4. The word 522 may also comprise a last encoded bit of SS 2 for the second synchronization unit, and the word 524 may also comprise a last encoded bit of SS 4 for the second synchronization unit. Accordingly, the multiplexed encoded bit stream 500 may comprise a next encoded word 526 corresponding to SS 1. The word 526 may also comprise a last encoded bit of SS 1 for the second synchronization unit. Accordingly, the word 526 may also comprise a last encoded bit of the second synchronization unit.

Figure 6A:
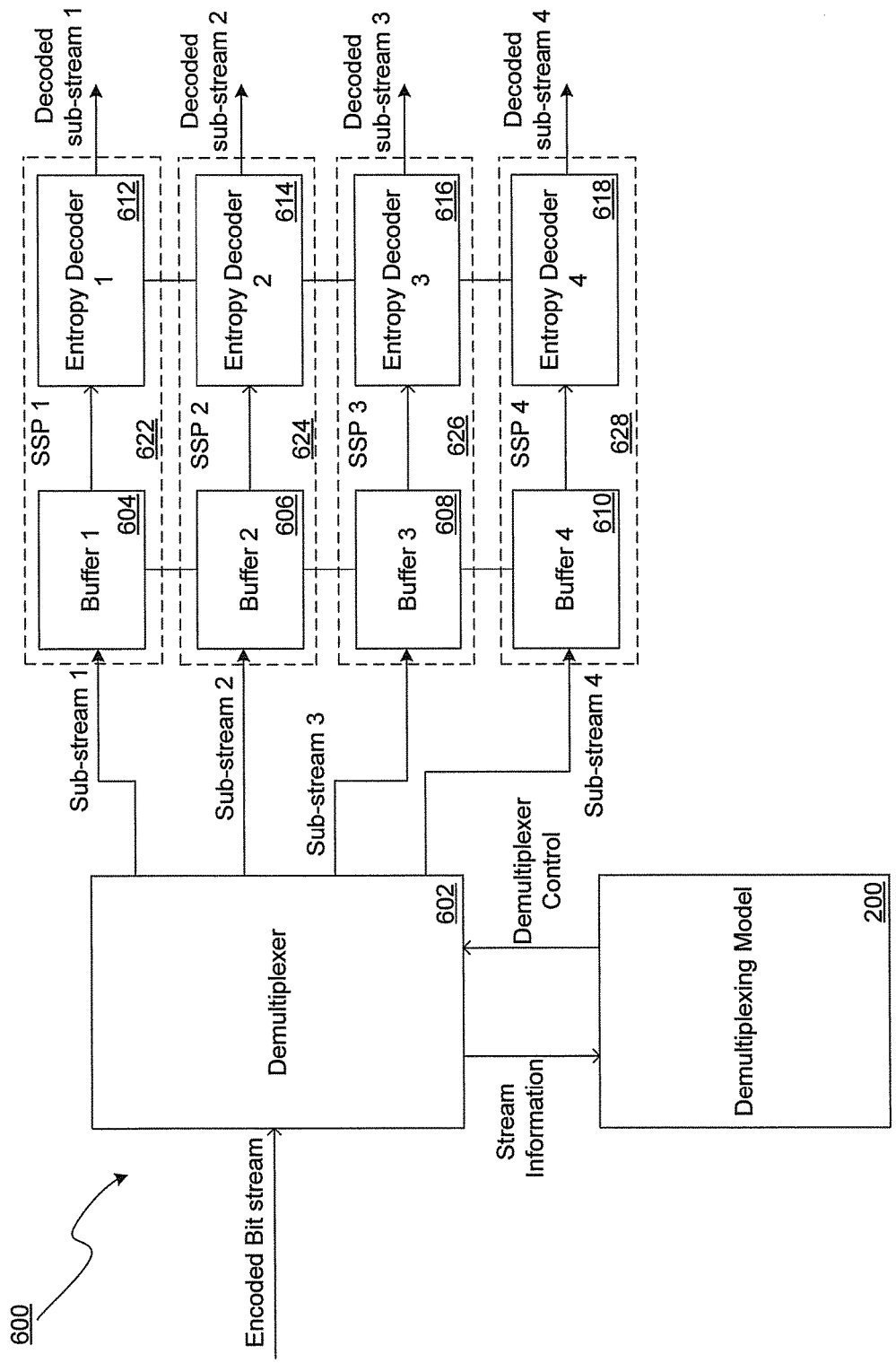
FIG. 6A is a block diagram of an exemplary decoder comprising a demultiplexing controller, in accordance with an embodiment of the invention.

FIG. 6A is a block diagram of an exemplary decoder comprising a demultiplexing model, in accordance with an embodiment of the invention. Referring to FIG. 6A, there is shown a decoder 600. The decoder 600 may comprise a demultiplexing model 200, as described with respect to FIG. 2, a demultiplexer 602, and a plurality of sub-stream processors, SSP 1 622, SSP 2 624, SSP 3 626, and SSP 4 628. Each sub-stream processor may comprise a buffer and an entropy decoder. For example, SSP 1 622 may comprise a buffer 604 and an entropy decoder 612, SSP 2 624 may comprise a buffer 606 and an entropy decoder 614, SSP 3 626 may comprise a buffer 608 and an entropy decoder 616, and SSP 4 628 may comprise a buffer 610 and an entropy decoder 618.

The demultiplexer 602 may comprise suitable logic, circuitry, interfaces, and/or code that may be operable to receive an encoded bit stream and demultiplex at least a portion of the encoded bit stream into a plurality of sub-streams, for example, sub-stream 1, sub-stream 2, sub-stream 3, and sub-stream 4. Notwithstanding, the invention may not be so limited, and the demultiplexer 602 may be operable to demultiplex the encoded bit stream into any number of sub-streams without limiting the scope of the invention. In accordance with an embodiment of the invention, the encoded bit stream may be constructed without adding one or more bits to the encoded bit stream to facilitate the demultiplexing operation.

Each of the plurality of buffers, for example, the buffers 604, 606, 608, and 610 may comprise suitable logic, circuitry, interfaces, and/or code that may be operable to store data corresponding to one or more of the demultiplexed plurality of sub-streams. For example, the buffer 604 may be operable to store data corresponding to sub-stream 1. Similarly, the buffer 606 may be operable to store data corresponding to sub-stream 2, the buffer 608 may be operable to store data corresponding to sub-stream 3, and the buffer 610 may be operable to store data corresponding to sub-stream 4.

Each of the plurality of entropy decoders, for example, the entropy decoders 612, 614, 616, and 618 may comprise suitable logic, circuitry, interfaces, and/or code that may be operable to entropy decode at least a portion of each of the stored demultiplexed plurality of sub-streams independently and/or in parallel. Each of the plurality of entropy decoders, for example, the entropy decoders 612, 614, 616, and 618 may be operable to generate a decoded sub-stream. For example, the entropy decoder 612 may be operable to entropy decode at least a portion of data corresponding to sub-stream 1 and generate a decoded sub-stream 1. Similarly, the entropy decoder 614 may be operable to entropy decode at least a portion of data corresponding to sub-stream 2 and generate a decoded sub-stream 2, the entropy decoder 616 may be operable to entropy decode at least a portion of data corresponding to sub-stream 3 and generate a decoded sub-stream 3, and the entropy decoder 618 may be operable to entropy decode at least a portion of data corresponding to sub-stream 4 and generate a decoded sub-stream 4.

The demultiplexing model 200 may be operable to receive bit stream information from the demultiplexer 602 and generate a control signal to the demultiplexer 602 in order to control the demultiplexing operation. The use of synchronization points may enable the embodiments of the demultiplexing model 200 in the encoder 300, as described with respect to FIG. 3, and the demultiplexing model 200 in the decoder 600, to have similar behavior, such that the demultiplexing operation of the demultiplexer 602 may correspond to the multiplexing operation of the multiplexer 302.

In operation, the decoder 600 may be operable to demultiplex at least a portion of an encoded bit stream into a plurality of sub-streams, for example, sub-stream 1, sub-stream 2, sub-stream 3, and sub-stream 4. The encoded bit stream, for example, the multiplexed encoded bit stream 500 may be constructed without adding one or more bits to the encoded bit stream to facilitate the demultiplexing operation. The demultiplexer 602 may be operable to concurrently demultiplex the encoded bit stream into the plurality of sub-streams, for example, sub-stream 1, sub-stream 2, sub-stream 3, and sub-stream 4. Each of the demultiplexed plurality of sub-streams may be entropy decoded by the corresponding plurality of entropy decoders 612, 614, 616, and 618 independently in parallel. Notwithstanding, the invention may not be so limited, and the demultiplexed plurality of sub-streams may be decoded by a single entropy decoder without limiting the scope of the invention.

In accordance with an exemplary embodiment of the invention, the plurality of buffers 604, 606, 608, and 610 and the plurality of entropy decoders 612, 614, 616, and 618 may correspond to the plurality of buffers 214, 216, 218, and 220 and the plurality of entropy decoders 222, 224, 226, and 228 in the demultiplexing model 200. The decoder 600 may be operable to utilize the demultiplexing model 200 to control the demultiplexer 602. For each instance in which the demultiplexing model 200 models the demultiplexing of the bit stream into a plurality of sub-streams, for example, sub-stream 1, sub-stream 2, sub-stream 3, and sub-stream 4, the demultiplexer 602 may be operable to concurrently demultiplex the bit stream into the plurality of sub-streams, for example, sub-stream 1, sub-stream 2, sub-stream 3, and sub-stream 4. The plurality of entropy decoders 612, 614, 616, and 618 may be operable to decode the plurality of sub-streams, for example, sub-stream 1, sub-stream 2, sub-stream 3, and sub-stream 4 concurrently and/or in parallel.

Figure 6B:
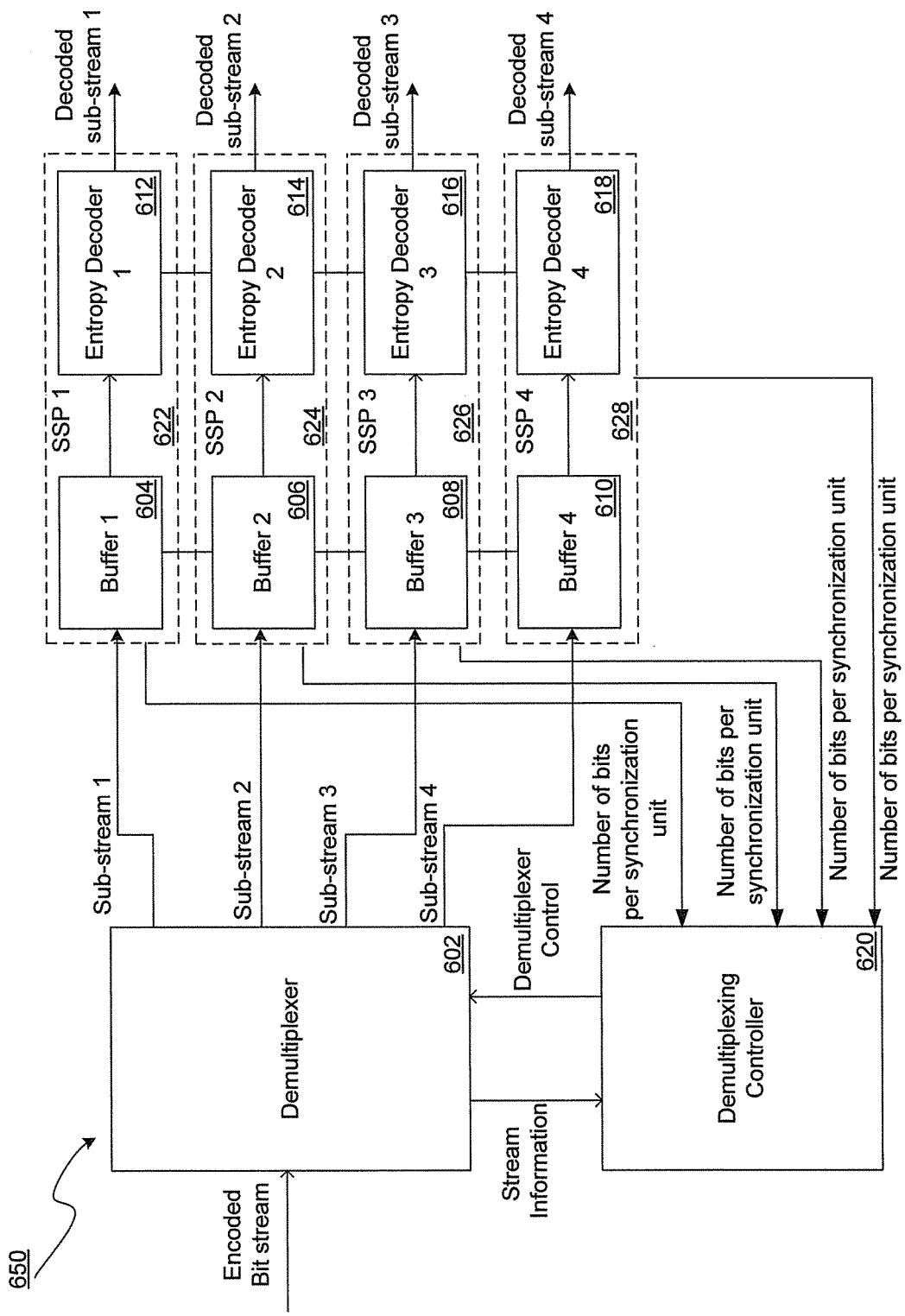
FIG. 6B is a block diagram of an exemplary decoder comprising a demultiplexing controller, in accordance with an embodiment of the invention.

FIG. 6B is a block diagram of an exemplary decoder comprising a demultiplexing controller, in accordance with an embodiment of the invention. Referring to FIG. 6B, there is shown a decoder 650. The decoder 650 may comprise a demultiplexing controller 620, a demultiplexer 602, and a plurality of sub-stream processors, SSP 1 622, SSP 2 624, SSP 3 626, and SSP 4 628. Each sub-stream processor may comprise a buffer and an entropy decoder. For example, SSP 1 622 may comprise a buffer 604 and an entropy decoder 612, SSP 2 624 may comprise a buffer 606 and an entropy decoder 614, SSP 3 626 may comprise a buffer 608 and an entropy decoder 616, and SSP 4 628 may comprise a buffer 610 and an entropy decoder 618.

The demultiplexing controller 620 may comprise suitable logic, circuitry, code, and/or interfaces that may be operable to receive information relating to a number of bits per synchronization unit from each of the plurality of SSPs 622, 624, 636 and 628. The demultiplexing controller 620 may communicate a control signal to the demultiplexer 602 to provide data to the plurality of SSPs 622, 624, 636 and 628 in response to the information relating to the number of bits per synchronization unit. A synchronization unit may, for example, consist of one syntax element or one entropy coded unit. Synchronization units may be grouped into sets of synchronization units, for example, a set may be a block of samples. The demultiplexing controller 620 and the demultiplexer 602 may pause providing data to one or more of the SSPs 622, 624, 636 and 628 that have completed entropy decoding all of a set of synchronization units when at least one other SSP has not completed entropy decoding all of a corresponding set of synchronization units.

In accordance with another exemplary embodiment of the invention, the decoder 600 may comprise fewer buffers and fewer entropy decoders than are included in the demultiplexing model 200. For example, the decoder 600 may have one buffer 604 and one entropy decoder 612 for reduced cost, if parallel entropy decoding is not required. For example, a bit stream may be constructed with four sub-streams using the demultiplexing model 200 with four parallel buffers 214, 216, 218, and 220 and entropy decoders 222, 224, 226, and 228. Each of the plurality of buffers 214, 216, 218, and 220 and each of the plurality of entropy decoders 222, 224, 226, and 228 may correspond to one sub-stream, for example. The decoder 600 may, for example, have two buffers 604 and 606, and two corresponding entropy decoders, 612 and 614, with each buffer and entropy decoder processing two of the sub-streams, for example. Similarly, in this example of a bit stream with four sub-streams, the decoder 600 may have one, two, three or four buffers and entropy decoders, with each entropy decoder processing four, three, two, or one sub-stream, for example. In another embodiment of the invention, a bit stream may be constructed of 17 sub-streams, for example, one for each of 16 sub-blocks in a macroblock and one for the macroblock header information. The decoder 600, in this case, may comprise any number from 1 to 17 entropy decoders to process the macroblock.

The demultiplexer 602 may be operable to communicate a signal to each of the plurality of SSPs 622, 624, 626, and 628 to begin the processing of data. Each of the plurality of SSPs 622, 624, 626, and 628 may be operable to indicate certain state information to the demultiplexer 602 at any given time. The state information may comprise one of four possible states, for example, IDLE, BUSY, MORE, and DONE states. Initially, each of the plurality of SSPs 622, 624, 626, and 628 may be in the IDLE state, for example, before the demultiplexer 602 provides any data to any of the SSPs 622, 624, 626, and 628. Each of the SSPs 622, 624, 626, and 628 may be in the BUSY state once the demultiplexer 602 provides some data to one or more of the respective SSPs 622, 624, 626, and 628 and communicates a signal to each of the respective SSPs 622, 624, 626, and 628 to begin processing the data. One or more of the plurality of SSPs 622, 624, 626, and 628 may reach the MORE state or the DONE state at some point after receiving the provided data. The state of a particular SSP may reach the MORE state, in instances where the particular SSP's, for example, SSP 2's 624, entropy decoder 614 has decoded one or more bits from its corresponding buffer 606 such that the buffer 606 has space for at least one more word of data and/or the SSP 2 624 has not yet completed processing of the current synchronization unit. The state of a particular SSP may reach the DONE state, in instances where the particular SSP's, for example, SSP 4's 628 entropy decoder 618 has decoded all of the syntax elements of the current synchronization unit. In instances, where both the MORE and DONE states apply, the SSP's state may be the DONE state.

In instances where one or more of the SSPs, for example, SSPs 624, 626, and 628 indicate a MORE state, the demultiplexer 602 may be operable to provide a pre-determined amount of data to each of the one or more SSPs 624, 626, and 628 indicating the MORE state in a predetermined order of the SSPs 624, 626, and 628. In instances where one or more of the SSPs, for example, SSPs 626, and 628 indicate a DONE state, the corresponding buffers 608 and 610 may not receive more data from the demultiplexer 602 for the current synchronization unit. In an exemplary embodiment, the demultiplexer 602 may wait to provide data to the one or more SSPs 622, 624, 626, and 628 until all SSPs 622, 624, 626, and 628 have indicated either the MORE state or the DONE state. When all the SSPs 622, 624, 626, and 628 indicate the DONE state, the synchronization unit has been fully processed by all the SSPs 622, 624, 626, and 628. The demultiplexer 602 may then repeat the process for the next synchronization unit. If there are no more synchronization units, the demultiplexing operation may terminate. When the last synchronization unit of data such as a slice or a macroblock of data has been processed, the demultiplexer 602 may be operable to communicate a signal to each of the plurality of SSPs 622, 624, 626, and 628 to delete one or more bits of data remaining in the corresponding buffer, for example, the buffers 604, 606, 608, and 610 respectively, at the end of processing of the synchronization unit. When the last synchronization unit of data has been processed, the demultiplexer 602 may be operable to retain some data of the last synchronization unit that may be useful for decoding of a subsequent unit of data, such as a slice or picture. The demultiplexer 602 may also be operable to communicate a signal to each of the plurality of SSPs 622, 624, 626, and 628 to utilize one or more bits of data remaining in the corresponding buffer, for example, the buffers 604, 606, 608, and 610 respectively, at the end of processing of a synchronization unit, for the processing of a subsequent synchronization unit. Subsequently, the demultiplexer 602 may be operable to resume demultiplexing operations starting with the next synchronization unit.

The sizes of the predetermined amounts of data provided by the demultiplexer 602 may differ between the SSPs 622, 624, 626, and 628. In an exemplary embodiment of the invention, the sizes of the predetermined amounts of data may be equal, and this amount may be referred to as a word. The size of a word may be chosen for a design according to various factors, such as the processing speed of the SSPs 622, 624, 626, and 628, in units of bits per unit time, compared to the processing speed of the demultiplexer 602, in terms of words per unit time. It may be advantageous to choose a relatively small word size, for example, to minimize buffer sizes, or it may be advantageous to choose a relatively large word size, for example, to maximize throughput rate. The sizes of words demultiplexed by the demultiplexer 602 may vary within one sub-stream. For example, the demultiplexer may demultiplex and provide to an SSP, an amount of data that is based on the number of bits decoded by the SSP's entropy decoder as the entropy decoder decodes one or more syntax elements.

In accordance with an exemplary embodiment of the invention, each of the plurality of entropy decoders 612, 614, 616, and 618 may be operable to process one bit per clock cycle. The demultiplexer 602 may be operable to process one word per clock cycle, for example. While all four SSPs 622, 624, 626, and 628 are concurrently processing a synchronization unit, the maximum aggregate rate of data consumed by the four SSPs 622, 624, 626, and 628 may be 4 bits per clock cycle. A word size of 4 bits may be sufficient for the demultiplexer 602 to ensure that all four SSPs 622, 624, 626, and 628 are supplied with data to process without waiting for data. A word size of 4 bits may be suitable in this example. Notwithstanding, larger word sizes such as 6 bits, 8 bits, 32 bits or other values may also be suitable, without limiting the scope of the invention.

In another exemplary embodiment of the invention, there may be three SSPs 622, 624, and 626. Each of the corresponding plurality of entropy decoders 612, 614, and 616 may be operable to process one syntax unit per clock cycle, and the number of bits in one syntax element may range from 1 to 16 bits, for example. The demultiplexer 602 may be operable to process one word per clock cycle. While all three SSPs 622, 624, and 626 are concurrently processing a synchronization unit, the maximum aggregate rate of data consumed by the three SSPs 622, 624, and 626 may be 16 bits times 3, which equals 48 bits per clock cycle. A word size of 48 bits would be sufficient for the demultiplexer 602 to ensure that all three SSPs 622, 624, and 626 are supplied with data to process without waiting for data while continuously processing syntax elements of 16 bits each. A word size of 48 bits may be suitable in this example. Notwithstanding, other word sizes such as 64 bits, 128 bits, or other smaller word sizes may be suitable without limiting the scope of the invention. In another exemplary embodiment of the invention, there may be three SSPs 622, 624 and 626. The number of bits in one syntax element may range from 1 to 16 bits, for example. The demultiplexer 602 may supply data to the three SSPs 622, 624 and 626 in one clock cycle.

A word size of 16 bits may be sufficient for the demultiplexer 602 to ensure that the three SSPs 622, 624, and 626 are supplied with data to process without waiting for data while continuously processing syntax elements of 16 bits each.

In an exemplary embodiment of the invention, which is applied to a video stream, multiple sub-streams and the SSPs 622, 624, 626, and 628, for example, may be associated with each 8×8 block in a 16×16 macroblock, with separate sets of 8×8 blocks for each component that may be labeled Y, Cb and Cr, for example. A separate sub-stream and SSP may be associated with macroblock headers. In case of 4:4:4 sampling with AVC/H.264 video, each macroblock has four 8×8 blocks for each component, plus headers. There may be 13 sub-streams, that is, one for each 8×8 block of each component plus one for macroblock headers. The demultiplexer 602 and an entropy decoding system with 13 SSPs may enable entropy decoding at approximately 12 or 13 times the throughput that would be available with a single entropy decoder.

In operation, the demultiplexer 602 may be operable to demultiplex the input bit stream and place a pre-determined amount of data from the input bit stream into each of the plurality of buffers, for example, the buffers 604, 606, 608, and 610 in a specified sequence. Each of these amounts of data may be from one sub-stream. Each of the plurality of entropy decoders, for example, the entropy decoders 612, 614, 616, and 618 may be operable to decode at least a portion of the data stored in the corresponding buffer. The timing of the plurality of entropy decoding operations may be coordinated within the decoder 600 in accordance with one or more constructs of the syntax of the bit stream.

In accordance with an exemplary embodiment of the invention, there may be three components of a macroblock of video data that may be labeled as Y, U and V. One sub-stream may be associated with each of the components, Y, U and V. There may be three buffers and associated entropy decoders, one for each sub-stream. In this example, each entropy decoder, such as the plurality of entropy decoders 612, 614 and 616 may be operable to entropy decode all of the bits associated with its component of one macroblock, at which point the operations of the three entropy decoders may be synchronized in the decoder 600.

In accordance with another exemplary embodiment of the invention, a video bit stream may comprise macroblocks, and each macroblock may comprise header information and body information, for example. One sub-stream may be associated with the header information of a plurality of macroblocks, and another sub-stream may be associated with the body information of a plurality of macroblocks, for example. Notwithstanding, other partitions of compressed data into sub-streams may be utilized without departing from the scope of the invention. The complete bit stream may be partitioned into sub-streams according to any type of syntax element, for example, motion vectors, quantization information, mode information, and/or blocks of transformed information. The data associated with a macroblock, which may comprise a plurality of blocks of transformed information may be partitioned into separate sub-streams corresponding to the different blocks or sets of blocks, for example.

In accordance with an embodiment of the invention, once the operations of the plurality of entropy decoders 612, 614, 616, and 618 are synchronized after processing a certain amount of data, the demultiplexer 602 may be operable to determine how much data has been consumed from one or more of the plurality of buffers 604, 606, 608, and 610 by the associated entropy decoders 612, 614, 616, and 618. Accordingly, the demultiplexer 602 may be operable to demultiplex at least a subsequent portion of the bit stream to fill or partially fill each of the plurality of buffers 604, 606, 608, and 610, in a specified sequence. The amounts of data placed into one or more of the plurality of buffers 604, 606, 608, and 610 by the demultiplexer 602 may be organized into conveniently sized units of data. For example, the demultiplexing operation may be performed in units of 1 bit at a time, or 8 bits at a time, or 16 bits, or 32 bits at a time, or any other convenient unit of size. Using a relatively large number of units of data for demultiplexing may facilitate high speed operation of the demultiplexer 602.

Figure 7:
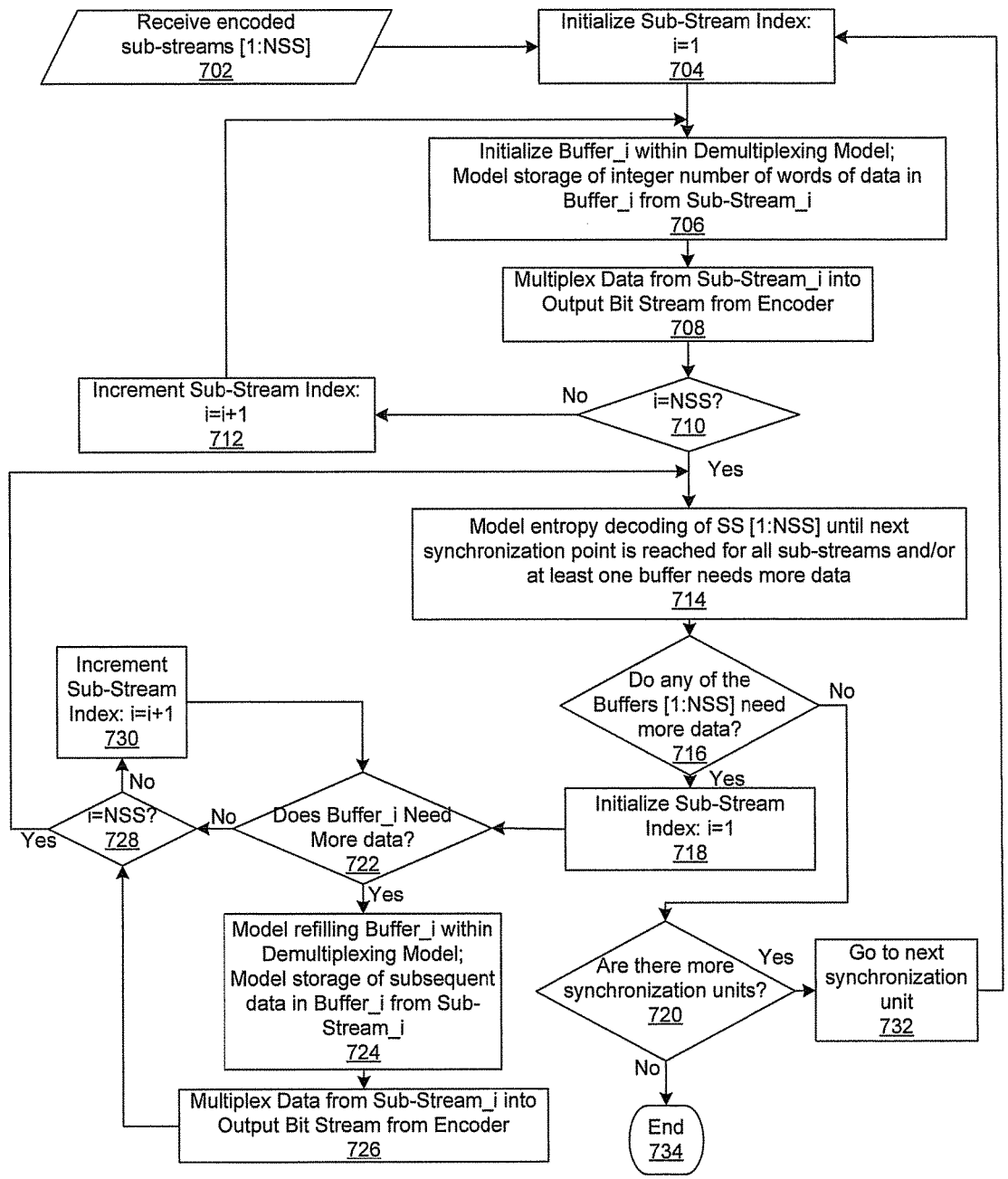
FIG. 7 is a flow chart illustrating exemplary steps for zero overhead parallel entropy encoding, in accordance with an embodiment of the invention.

FIG. 7 is a flow chart illustrating exemplary steps for zero overhead parallel entropy encoding, in accordance with an embodiment of the invention. Referring to FIG. 7, in step 702, the multiplexer 302 may receive the encoded sub-streams 1 to number of sub-streams (NSS). In step 704, a sub-stream index i may be initialized to be equal to 1. In step 706, a particular buffer, Buffer_i within the demultiplexing model 200 may be initialized. The storage or filling of an integer number of words of data in Buffer_i from the corresponding sub-stream_i may be modeled. In an exemplary embodiment of the invention, a maximum possible number of words of the first sub-stream that may fit into the first buffer may be modeled to be placed into the first buffer. Similarly, a maximum possible number of words of the second sub-stream that may fit into the second buffer may be modeled to be placed into the second buffer, and so on with all the buffers in the demultiplexing model 200. In another embodiment, one word of each sub-stream may be modeled to be placed into each respective buffer. In step 708, as each word of sub-stream data is modeled to be placed in Buffer_i in the demultiplexing model 200, concurrently a corresponding word of data from sub-stream_i may be multiplexed into an output bit stream from the encoder 300.

In step 710, it may be determined whether the index i equals the number of sub-streams. In instances where the index i does not equal the number of sub-streams, control passes to step 712. In step 712, the index i may be incremented by 1, and control returns to step 706 to model filling the next buffer with data from the corresponding sub-stream_i.

In instances where the index i equals the number of sub-streams, control passes to step 714. In step 714, each of the plurality of entropy decoders for each sub-stream within the demultiplexing model 200 may model entropy decoding the demultiplexed plurality of sub-streams until one or both of an end of the processing of the synchronization unit is reached for all sub-streams and/or the corresponding buffer has space for at least one more word of data associated with each of the demultiplexed plurality of sub-streams. In step 716, it may be determined whether any of the plurality of buffers associated with each of the plurality of sub-streams needs more data for processing the synchronization unit. In instances where none of the plurality of buffers associated with each of the plurality of sub-streams needs any more data for processing the synchronization unit, control passes to step 720. In step 720, it may be determined whether there are any more synchronization units to be processed. In instances where there are no more synchronization units to be processed, control passes to end step 734 indicating the end of processing of the last synchronization unit. In instances where there is at least one more synchronization unit to be processed, control passes to step 732 to process the next synchronization unit. Control then returns to step 704.

In instances where at least one of the plurality of buffers associated with each of the plurality of sub-streams needs more data for processing the synchronization unit, control passes to step 718. In step 718, the sub-stream index i may be initialized to be equal to 1. In step 722, it may be determined whether a particular buffer, Buffer_i needs more data to process the synchronization unit. In instances where the particular Buffer_i needs more data to process the synchronization unit, control passes to step 724. In step 724, the particular Buffer_i may be modeled to be refilled with an integer number of words of subsequent data from sub-stream_i by modeling demultiplexing a subsequent portion of the encoded bit stream into a subsequent plurality of sub-streams. In step 726, one or more words of data from sub-stream_i corresponding to the one or more words of data used to fill Buffer_i in the demultiplexing model 200 may be multiplexed into an output bit stream from the encoder 300. Control then passes to step 728. In instances where the particular Buffer_i does not need more data to process the synchronization unit, control passes to step 728.

In step 728, it may be determined whether the index i equals the number of sub-streams. In instances where the index i does not equal the number of sub-streams, control passes to step 730. In step 730, the index i may be incremented by 1, and control returns to step 722 to determine whether the next buffer needs more data to process the synchronization unit. In instances where the index i equals the number of sub-streams, control returns to step 714.

Figure 8:
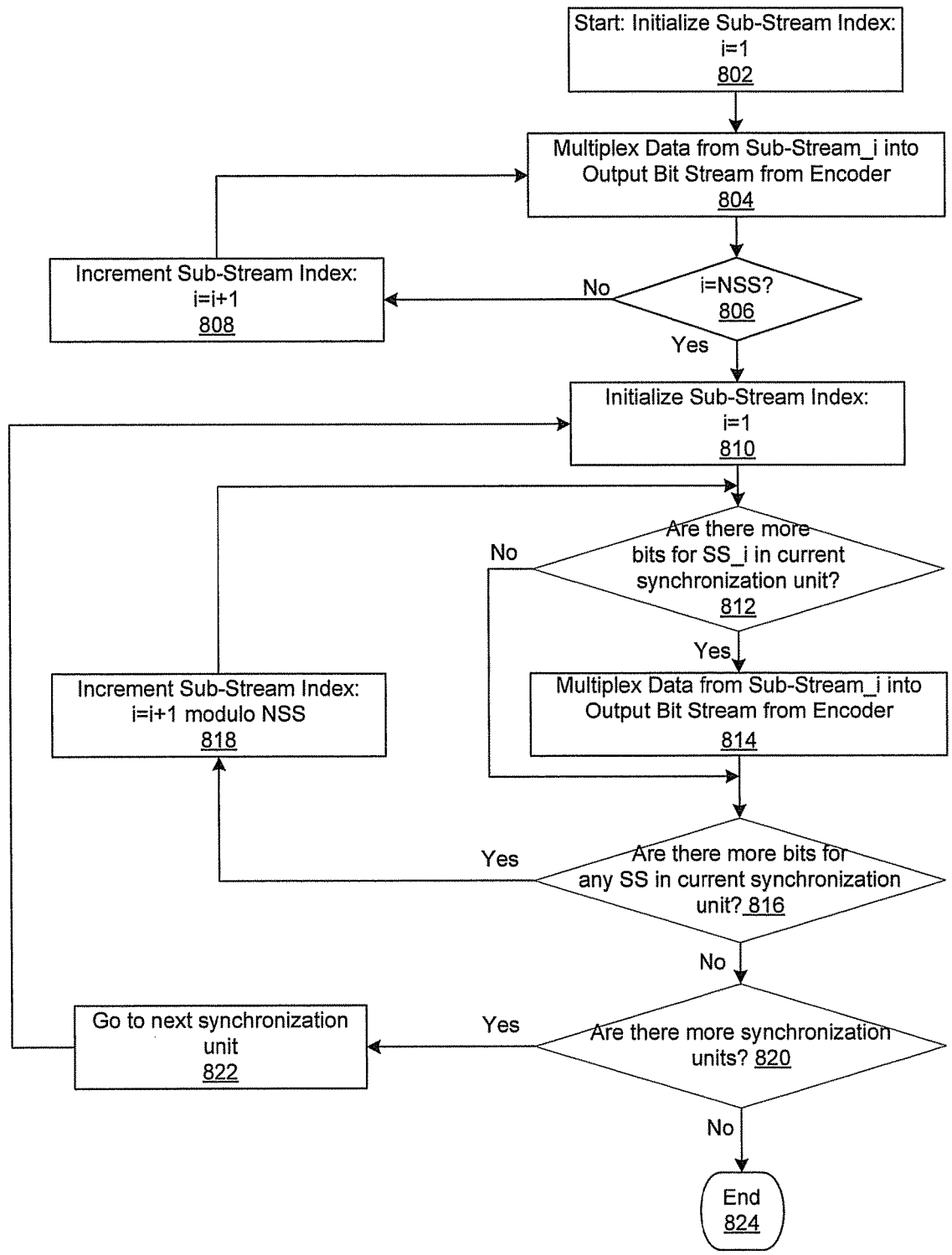
FIG. 8 is another flow chart illustrating exemplary steps for zero overhead parallel entropy encoding, in accordance with an embodiment of the invention.

FIG. 8 is another flow chart illustrating exemplary steps for zero overhead parallel entropy encoding, in accordance with an embodiment of the invention. Referring to FIG. 8, in step 802, a sub-stream index i may be initialized to be equal to 1. In step 804, an integer number of words of data from sub-stream_i may be multiplexed into an output bit stream from the encoder 400. In step 806, it may be determined whether the index i equals the number of sub-streams. In instances where the index i does not equal the number of sub-streams, control passes to step 808. In step 808, the index i may be incremented by 1, and control returns to step 804 to multiplex an integer number of words of data from sub-stream_i into an output bit stream. In instances where the index i equals the number of sub-streams, control passes to step 810.

In step 810, the sub-stream index i may be initialized to be equal to 1. In step 812, it may be determined whether there are any more bits for processing for the sub-stream_i in the current synchronization unit. In instances where there are one or more bits for processing for the sub-stream_i in the current synchronization unit, control passes to step 814. In step 814, an integer number of words of data from sub-stream_i may be multiplexed into an output bit stream from the encoder 400, and control passes to step 816. In instances where there are no more bits for processing for the sub-stream_i in the current synchronization unit, control directly passes to step 816.

In step 816, it may be determined whether there are any more bits for processing for any sub-stream in the current synchronization unit. In instances where there are one or more bits for processing for at least one sub-stream in the current synchronization unit, control passes to step 818. In step 818, the sub-stream index_i may be incremented based on a remaining number of sub-streams, and control returns to step 812.

In instances where there are no more bits for processing for at least one sub-stream in the current synchronization unit, control passes to step 820. In step 820, it may be determined whether there are any more synchronization units to be processed. In instances, where there are no more synchronization units to be processed, control passes to end step 824 indicating the end of processing of the last synchronization unit. In instances where there is at least one more synchronization unit to be processed, control passes to step 822 to process the next synchronization unit. Control then returns to step 810.

Figure 9:
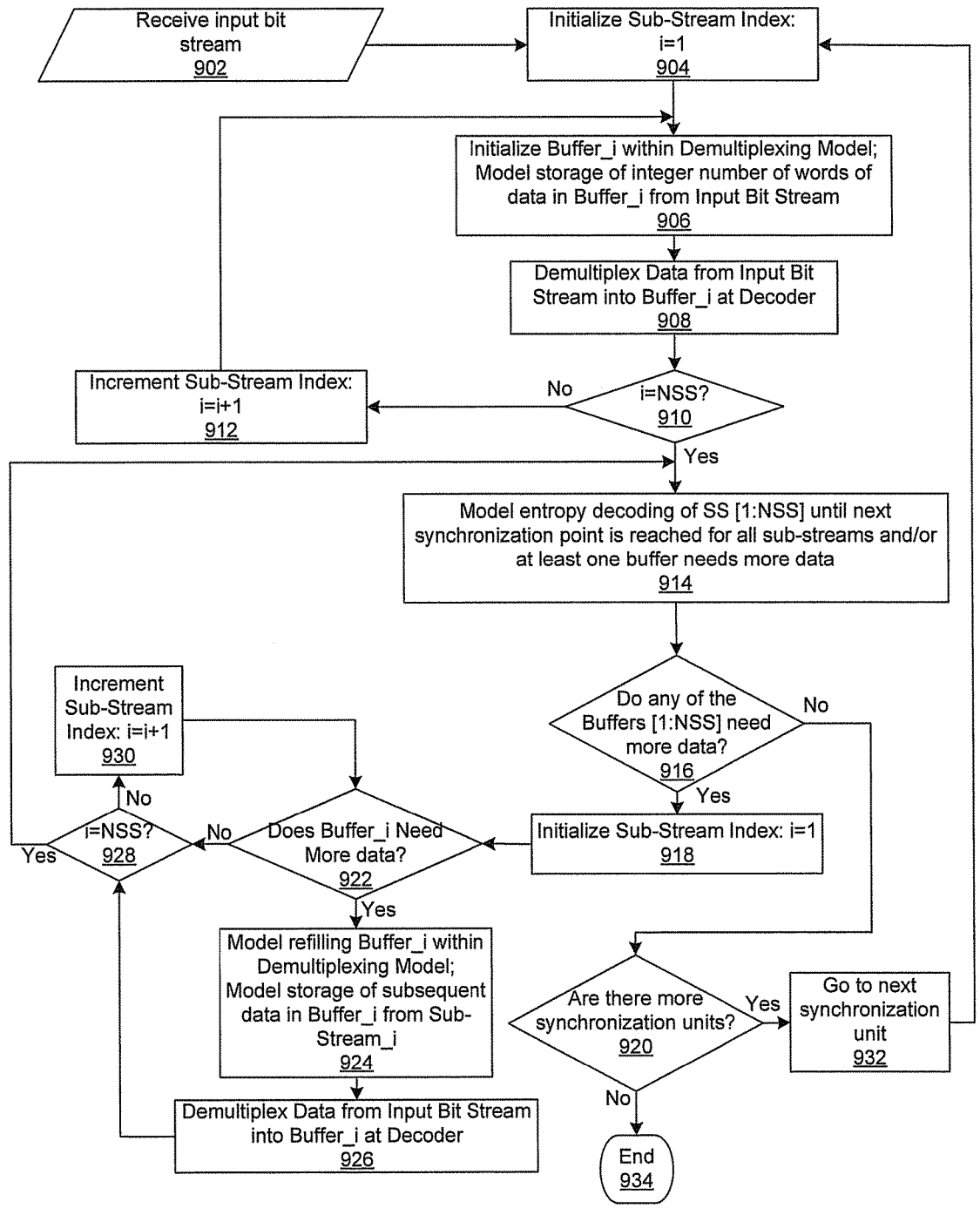
FIG. 9 is a flow chart illustrating exemplary steps for zero overhead parallel entropy decoding, in accordance with an embodiment of the invention.

FIG. 9 is a flow chart illustrating exemplary steps for zero overhead parallel entropy decoding, in accordance with an embodiment of the invention. Referring to FIG. 9, in step 902, the demultiplexer 602 may receive the input bit stream. In step 904, a sub-stream index i may be initialized to be equal to 1. In step 906, a particular buffer, Buffer_i within the demultiplexing model 200 may be initialized. The Buffer_i may be modeled to store or fill an integer number of words of data from the input bit stream. In an exemplary embodiment, a maximum possible number of words of the input bit stream that may fit into the first buffer may be modeled to be placed into the first buffer. Similarly, a maximum possible number of words of the input bit stream that may fit into the second buffer may be modeled to be placed into the second buffer, and so on with all the buffers in the demultiplexing model 200. In step 908, as each word of bit stream data is modeled to be placed in Buffer_i in the demultiplexing model 200, concurrently a corresponding word of data from the bit stream may be demultiplexed into the associated buffers 604, 606, 608, and 610 of the decoder 600.

In step 910, it may be determined whether the index i equals the number of sub-streams. In instances where the index i does not equal the number of sub-streams, control passes to step 912. In step 912, the index i may be incremented by 1, and control returns to step 906 to model filling the next buffer with data from the input bit stream.

In instances where the index i equals the number of sub-streams, control passes to step 914. In step 914, each of the plurality of entropy decoders for each sub-stream within the demultiplexing model 200 may model entropy decoding the demultiplexed plurality of sub-streams until one or both of an end of the processing of the synchronization unit is reached for all sub-streams and/or the corresponding buffer has space for at least one more word of data associated with each of the demultiplexed plurality of sub-streams. In step 916, it may be determined whether any of the plurality of buffers associated with each of the plurality of sub-streams needs more data for processing the synchronization unit. In instances where none of the plurality of buffers associated with each of the plurality of sub-streams needs any more data for processing the synchronization unit, control passes to step 920. In step 920, it may be determined whether there are any more synchronization units to be processed. In instances where there are no more synchronization units to be processed, control passes to end step 934 indicating the end of processing of the last synchronization unit. In instances where there is at least one more synchronization unit to be processed, control passes to step 932 to process the next synchronization unit. Control then returns to step 904.

In instances where at least one of the plurality of buffers associated with each of the plurality of sub-streams needs more data for processing the synchronization unit, control passes to step 918. In step 918, the sub-stream index i may be initialized to be equal to 1. In step 922, it may be determined whether a particular buffer, Buffer_i needs more data to process the synchronization unit. In instances where the particular Buffer_i needs more data to process the synchronization unit, control passes to step 924. In step 924, the particular Buffer_i may be modeled to be refilled with an integer number of words of subsequent data from sub-stream_i by modeling demultiplexing a subsequent portion of the encoded bit stream into a subsequent plurality of sub-streams. In step 926, as each word of bit stream data is placed in Buffer_i in the demultiplexing model 200, concurrently a corresponding word of data from the bit stream may be demultiplexed into the associated buffers 604, 606, 608, and 610 of the decoder 600. Control then passes to step 928. In instances where at step 922, the particular Buffer_i does not need more data to process the synchronization unit, control passes to step 928.

In step 928, it may be determined whether the index i equals the number of sub-streams. In instances where the index i does not equal the number of sub-streams, control passes to step 930. In step 930, the index i may be incremented by 1, and control returns to step 922 to determine whether the next buffer needs more data to process the synchronization unit. In instances where the index i equals the number of sub-streams, control returns to step 914.

Figure 10:
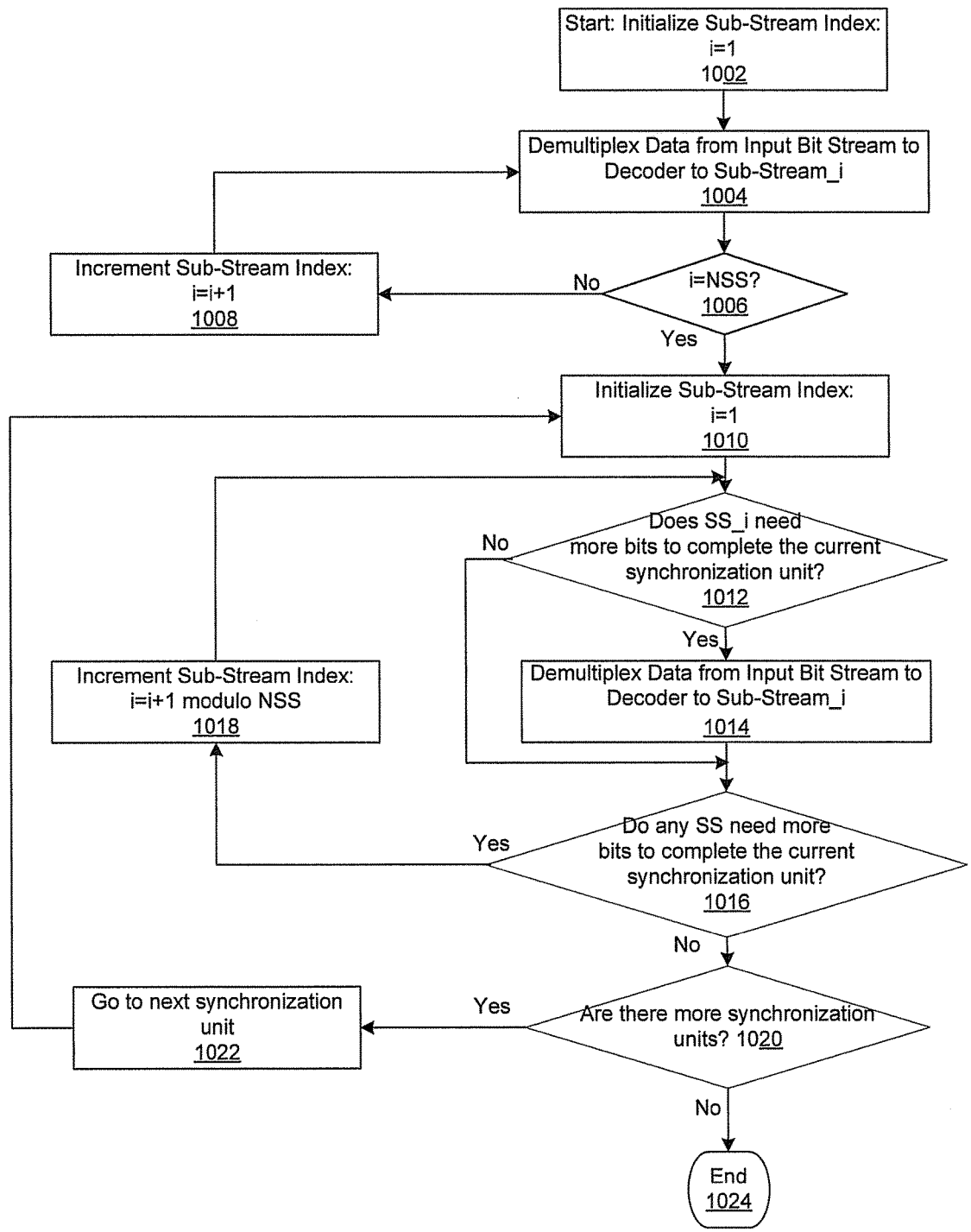
FIG. 10 is another flow chart illustrating exemplary steps for zero overhead parallel entropy decoding, in accordance with an embodiment of the invention.

FIG. 10 is another flow chart illustrating exemplary steps for zero overhead parallel entropy decoding, in accordance with an embodiment of the invention. Referring to FIG. 10, in step 1002, a sub-stream index i may be initialized to be equal to 1. In step 1004, an integer number of words of data from the input bit stream may be demultiplexed to a decoder into a corresponding sub-stream_i. In step 1006, it may be determined whether the index i equals the number of sub-streams. In instances where the index i does not equal the number of sub-streams, control passes to step 1008. In step 1008, the index i may be incremented by 1, and control returns to step 1004 to demultiplex an integer number of words of data from the input bit stream to a decoder into a corresponding sub-stream_i. In instances where the index i equals the number of sub-streams, control passes to step 1010.

In step 1010, the sub-stream index i may be initialized to be equal to 1. In step 1012, it may be determined whether the sub-stream_i needs any more bits to complete processing of the current synchronization unit. In instances where the sub-stream_i needs one or more bits to complete processing of the current synchronization unit, control passes to step 1014. In step 1014, an integer number of words of data from the input bit stream may be demultiplexed to a decoder into a corresponding sub-stream_i, and control passes to step 1016. In instances where the sub-stream_i does not need any more bits to complete processing of the current synchronization unit, control directly passes to step 1016.

In step 1016, it may be determined whether any sub-stream needs any more bits to complete processing of the current synchronization unit. In instances where one or more sub-streams need one or more bits to complete processing of the current synchronization unit, control passes to step 1018. In step 1018, the sub-stream index_i may be incremented based on a remaining number of sub-streams, and control returns to step 1012.

In instances where no other sub-stream needs one or more bits to complete processing of the current synchronization unit, control passes to step 1020. In step 1020, it may be determined whether there are any more synchronization units to be processed. In instances, where there are no more synchronization units to be processed, control passes to end step 1024 indicating the end of processing of the last synchronization unit. In instances, where there is at least one more synchronization unit to be processed, control passes to step 1022 to process the next synchronization unit. Control then returns to step 1010.

In accordance with an embodiment of the invention, a method and system for zero overhead parallel entropy decoding may comprise a decoder 600 (FIG. 6A) that comprises a demultiplexer 602 (FIG. 6A). The demultiplexer 602 may be operable to demultiplex at least a portion of an encoded bit stream into a plurality of sub-streams, for example, sub-stream 1, sub-stream 2, sub-stream 3, and sub-stream 4. The encoded bit stream may be constructed without adding one or more bits to the encoded bit stream to facilitate the demultiplexing operation. The plurality of entropy decoders 612 (FIG. 6A), 614, (FIG. 6A), 616 (FIG. 6A), and 618 (FIG. 6A) may be operable to entropy decode the plurality of sub-streams concurrently.

A demultiplexing model 200 (FIG. 2) may be operable to control the demultiplexer 602. Notwithstanding, the invention may not be so limited, and the demultiplexer 602 may be controlled by a demultiplexing controller 620 (FIG. 6B) without limiting the scope of the invention. The demultiplexing model 200 may be operable to concurrently model demultiplexing of at least a portion of the encoded bit stream into the plurality of sub-streams. The plurality of buffers 214 (FIG. 2), 216 (FIG. 2), 218 (FIG. 2), and 220 (FIG. 2) in the demultiplexing model 200 may be operable to model storage of each of the corresponding modeled demultiplexed plurality of sub-streams in the corresponding buffer. The plurality of entropy decoders 222 (FIG. 2), 224 (FIG. 2), 226 (FIG. 2), and 228 (FIG. 2) in the demultiplexing model 200 may be operable to model entropy decoding each of the modeled demultiplexed plurality of sub-streams independently in parallel. The plurality of entropy decoders 222, 224, 226, and 228 in the demultiplexing model 200 may be operable to model entropy decoding of at least a portion of each of the modeled stored demultiplexed plurality of sub-streams. The demultiplexer 202 (FIG. 2) in the demultiplexing model 200 may be operable to model demultiplexing of a subsequent portion of the encoded bit stream into a subsequent plurality of sub-streams based on the modeled entropy decoded at least portion of each of the modeled stored demultiplexed plurality of sub-streams. The demultiplexer 602 may be operable to concurrently demultiplex the subsequent portion of the encoded bit stream into the subsequent plurality of sub-streams.

The plurality of buffers 214, 216, 218, and 220 in the demultiplexing model 200 may be operable to model storage of a number of words associated with each of the modeled demultiplexed plurality of sub-streams in the corresponding buffer based on modeling processing of a synchronization unit. The plurality of entropy decoders 222, 224, 226, and 228 in the demultiplexing model 200 may be operable to model entropy decoding of the modeled demultiplexed plurality of sub-streams until one or both of: an end of the modeled processing of the synchronization unit is reached and/or at least one buffer has space for at least one more word of data associated with each of the modeled demultiplexed plurality of sub-streams. The demultiplexing model 200 may be operable to model deletion of one or more bits stored in the corresponding buffer, for example, one or more of the plurality of buffers 214, 216, 218, and 220 at the end of the modeled processing of the synchronization unit.

The demultiplexer 602 may be operable to demultiplex an integer number of words of the encoded bit stream into the plurality of sub-streams based on one of a number of bits utilized to decode a synchronization unit or a number of remaining bits in a buffer, for example, one or more of the buffers 604 (FIG. 6B), 606 (FIG. 6B), 608 (FIG. 6B), and 610 (FIG. 6B) corresponding to each of the plurality of sub-streams.

Exemplary aspects of the invention may also comprise an encoder 300 (FIG. 3) or 400 (FIG. 4) that comprises a multiplexer 302 (FIG. 3) or 402 (FIG. 4). Each of a plurality of encoded sub-streams may be multiplexed into an encoded bit stream. The encoded bit stream may be constructed without adding one or more bits to the encoded bit stream to indicate the multiplexing operation. The plurality of entropy encoders 612 (FIG. 6A), 614, (FIG. 6A), 616 (FIG. 6A), and 618 (FIG. 6A) may be operable to entropy encode the plurality of encoded sub-streams concurrently. The multiplexer 402 may be operable to multiplex an integer number of words from the plurality of encoded sub-streams into the encoded bit stream based on one of a number of bits utilized to encode a synchronization unit or a number of remaining bits in a buffer, for example, one or more of the buffers 412 (FIG. 4), 414 (FIG. 4), 416 (FIG. 4), and 418 (FIG. 4) corresponding to each of the plurality of encoded sub-streams.

A demultiplexing model 200 that is operable to control the multiplexer 302 may be operable to concurrently model demultiplexing of at least a portion of the encoded bit stream into a plurality of sub-streams, for example, sub-stream 1, sub-stream 2, sub-stream 3, and sub-stream 4. The multiplexer 302 may be operable to concurrently multiplex each of a subsequent plurality of encoded sub-streams into the subsequent portion of the encoded bit stream.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising a decoder that comprises a demultiplexer. An encoded bit stream may be demultiplexed into a plurality of sub-streams. The encoded bit stream may be constructed without adding one or more bits to the encoded bit stream to facilitate the demultiplexing.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising an encoder that comprises a multiplexer. Each of a plurality of encoded sub-streams may be multiplexed into an encoded bit stream. The encoded bit stream may be constructed without adding one or more bits to the encoded bit stream to indicate the multiplexing.

Accordingly, the present invention may be realized in hardware, or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for multiplexing of encoded sub-streams, comprising:
   multiplexing, by an encoding device, a first portion of each of a plurality of encoded sub-streams into a multiplexed stream;
   modeling, by a multiplexing controller the encoding device, decoding of each of the plurality of encoded sub-streams;
   determining, by the multiplexing controller of the encoding device, based on the modeling of decoding of each of the plurality of encoded sub-streams, that a first decoder of a decoding device decoding the first portion of a first encoded sub-stream of the plurality of encoded sub-streams will use additional data associated with the decoding of the first portion of the first encoded sub-stream before a second decoder of the decoding device utilizes the first portion of a second encoded sub-stream of the plurality of encoded sub-streams; and
   appending to the multiplexed stream, by the encoding device, a second portion of the first encoded sub-stream corresponding to the required additional data for the first decoder after the first portion of the second encoded sub-stream in the multiplexed stream, responsive to the determination;
   wherein appending the second portion of the first encoded-sub-stream to the multiplexed stream further comprises:
   appending, by the encoding device, the second portion of the first encoded sub-stream to the multiplexed stream before appending additional portions of the other encoded sub-streams into the multiplexed stream, the second portion of the first encoded sub-stream concatenated with the multiplexed stream without an intervening header.

2. The method of claim 1, further comprising:
   subsequently determining, by the multiplexing controller based on the modeling of decoding of each of the plurality of encoded sub-streams, that a second decoder of the decoding device decoding the first portion of a second encoded sub-stream of the plurality of encoded sub-streams will require additional data associated with the decoding of the first portion of the second encoded sub-stream; and
   appending to the multiplexed stream, by the encoding device, a second portion of the second encoded sub-stream corresponding to the required additional data, responsive to the determination;

wherein the first portion of the second encoded sub-stream is not consecutive to the first portion of the first encoded sub-stream in the multiplexed stream.

3. The method of claim 2, wherein the multiplexed stream comprises the first portion of the first and second encoded sub-streams in a first order, and the second portion of the first and second encoded sub-streams in a second, different order.

4. The method of claim 1, wherein multiplexing the first portion of each of the plurality of encoded sub-streams into the multiplexed stream further comprises:

multiplexing the first portion of each of the plurality of encoded sub-streams into the multiplexed stream, responsive to each of the plurality of encoded sub-streams reaching a synchronization point.

5. The method of claim 1, wherein multiplexing the first portion of each of the plurality of encoded sub-streams into the multiplexed stream further comprises:

multiplexing an integer number of words from each of the plurality of encoded sub-streams into the multiplexed stream.

6. The method of claim 1, wherein determining that the first decoder of the decoding device decoding the first portion of the first encoded sub-stream of the plurality of encoded sub-streams will require additional data further comprises:

identifying, by the multiplexing controller from the decoding model of the encoding device corresponding to the first sub-stream, that a buffer of the first decoder of the decoding device will have space for at least one additional word of data, after decoding at least some of the first portion of the first encoded sub-stream.

7. The method of claim 1, wherein determining that the first decoder of the decoding device decoding the first portion of the first encoded sub-stream of the plurality of encoded sub-streams will require additional data further comprises:

identifying, by the multiplexing controller from the decoding model of the encoding device corresponding to the first sub-stream, that the first decoder of the decoding device will need at least one additional word of data to decode a syntax element with a particular value.

8. The method of claim 7, wherein appending the second portion of the first encoded sub-stream to the multiplexed stream further comprises appending said at least one additional word of data of the first encoded sub-stream to the multiplexed stream, responsive to the identification.

9. A method for demultiplexing of encoded sub-streams, comprising:

demultiplexing, by a decoding device, a multiplexed stream into a first portion of each of a plurality of encoded sub-streams, the multiplexed stream comprising a concatenated plurality of first portions of the plurality encoded sub-streams and a second portion of the first encoded sub-stream appended to the first portions responsive to a determination by a decoder model of a multiplexing controller of an encoding device transmitting the multiplexed stream that a first decoder of the decoding device will use the second portion of the data before a second decoder of the device requires additional data;

decoding, by a corresponding plurality of decoders of the decoding device, each of the first portions of the plurality of encoded sub-streams;

determining, by the decoding device, that a first decoder, decoding a first portion of a first encoded sub-stream of the plurality of encoded sub-streams, requires additional data associated with the decoding of the first portion of the first encoded sub-stream; and responsive to the determination, directing a subsequent portion of the multiplexed stream to the first decoder, by the decoding device, the subsequent portion comprising a second portion of the first encoded sub-stream corresponding to the required additional data, concatenated with a previous portion of another encoded sub-stream, without intervening data.

10. The method of claim 9, wherein directing the subsequent portion of the multiplexed stream to the first decoder further comprises demultiplexing the multiplexed stream into the second portion of the first encoded sub-stream before demultiplexing the multiplexed stream into additional portions of the other encoded sub-streams of the multiplexed stream.

11. The method of claim 9, further comprising:

subsequently determining, by the decoding device, that a second decoder of a first portion of a second encoded sub-stream of the plurality of encoded sub-streams requires additional data associated with the decoding of the first portion of the second encoded sub-stream; and responsive to the determination, directing a further subsequent portion of the multiplexed stream to the second decoder, by the decoding device, the further subsequent portion comprising a second portion of the second encoded sub-stream corresponding to the required additional data, concatenated with the second portion of the first encoded sub-stream, without intervening data;

wherein the first portion of the second encoded sub-stream is not consecutive to the first portion of the first encoded sub-stream in the multiplexed stream.

12. The method of claim 9, wherein the multiplexed stream comprises the first portion of the first and second encoded sub-streams in a first order, and the second portion of the first and second encoded sub-streams in a second, different order.

13. The method of claim 9, wherein demultiplexing the multiplexed stream into the first portion of each of the plurality of encoded sub-streams further comprises:

demultiplexing the multiplexed stream into the first portion of each of the plurality of encoded sub-streams, responsive to each of the plurality of decoded sub-streams reaching a synchronization point.

14. The method of claim 9, wherein determining that the first decoder of the first portion of the first encoded sub-stream of the plurality of encoded sub-streams requires additional data further comprises:

identifying, by the decoding device, that a buffer of the first decoder has space for at least one additional word of data, after decoding at least some of the first portion of the first encoded sub-stream.

15. The method of claim 14, wherein directing the subsequent portion of the multiplexed stream to the first decoder further comprises extracting said at least one additional word of data of the first encoded sub-stream from the multiplexed stream, responsive to the identification.

16. The method of claim 9, wherein determining that the first decoder of the first portion of the first encoded sub-stream of the plurality of encoded sub-streams requires additional data further comprises:

identifying, by the decoding device, that the first decoder requires at least one additional word of data to decode a syntax element with a particular value.

\* \* \* \* \*